Aug. 12, 1969  LE ROY B. OVERSTREET, JR  3,460,329

TREE SHAKER

Filed Aug. 29, 1966  2 Sheets-Sheet 1

INVENTOR.
LEROY B. OVERSTREET
BY John R. Walker, III
Attorney

INVENTOR.
LEROY B. OVERSTREET
BY John R. Walker, III
Attorney

3,460,329
Patented Aug. 12, 1969

3,460,329
TREE SHAKER
Le Roy B. Overstreet, Jr., Louisville, Miss., assignor, by mesne assignments, to Thomson Machinery Co., Inc., Thibodaux, La.
Filed Aug. 29, 1966, Ser. No. 575,851
Int. Cl. A01g *19/00;* B66c *1/42*
U.S. Cl. 56—328    2 Claims

ABSTRACT OF THE DISCLOSURE

The tree shaker disclosed includes three arms arranged to engage the tree at places about 120° apart. Two arms pivot into and out of engagement. The third arm reciprocates into and out of engagement with the tree and in so doing pulls the other two pivoted arms into and out of engagement. Weights are eccentrically mounted for rotation on each of the pivoting arms. The weights are rotated through an endless chain to insure that they rotate in phase so that the forces imparted to the arms by the weights are parallel and applied in the same constantly changing direction. This imposes a circular vibration on the arms which, in turn, is imparted to the tree.

---

This invention relates to devices for shaking trees, such as fruit and nut bearing trees so as to cause the fruit or nuts to fall to the ground or into a net or the like for the harvesting thereof.

Heretofore, previous tree shakers were not very efficient for one reason or another. For example, many of the prior shakers had vibration devices located remotely from the tree so that much of the vibration was lost in the mass of the shaker structure between the vibration mechanism and the tree. Also, in a number of the prior shakers there was not an efficient transfer of the vibration forces from the portion of the device that contacted the tree to the tree itself. Thus, in one such device which utilizes tree contacting elements disposed on opposite sides of the tree, when the forces were tangent to the tree, there was little or no effective transfer of motion to the tree and only when the forces were towards or away from the tree was there transfer of such motion. When the forces were tangent to the tree, the shaker had a tendency to pivot back and forth and thus damage the bark of the tree by the twisting action. Consequently the tree would vibrate in only substantially one plane leaving some of the limbs static.

The present invention is directed towards overcoming the above-mentioned and other disadvantages in prior shakers.

Thus, one of the objects of the present invention is to provide a highly efficient tree shaker in which the vibrations are put into the tree rather than into the mass of the shaking device.

A further object is to provide such a tree shaker in which the eccentric weights are closely adjacent the tree and are substantially in line with one another and with the tree.

A further object is to provide such a tree shaker in which is provided a unique clamping arrangement in which the jaw arms thereof contact the tree at places substantially 120° apart, thereby creating three contact points or places all equal and opposing through the tree.

A further object is to provide a clamping mechanism which is useful for other purposes such as paper roll clamps or log clamps.

A further object is to provide such a tree shaker in which the eccentric weights are timed together to give a circular vibration to the clamping mechanism that in turn is efficiently transmitted to the tree.

A further object is to provide such a tree shaker in which the forces are transmitted to the tree efficiently regardless of the position of the eccentric weights.

A further object is to provide such a clamping mechanism that utilizes only a single piston-cylinder assembly for clamping.

A further object is to provide such a clamping mechanism which includes a linearly movable arm and a pair of pivotable jaws or arms pivotable responsive to movement of the intermediate arm to which the piston-cylinder assembly is connected.

A further object is generally to improve the design and construction of tree shakers and clamping mechanisms.

The means by which the foregoing and other objects of the present invention are accomplished and the manner of their accomplishment will be readily understood from the following specification upon reference to the accompanying drawings, in which.

Figure 1:
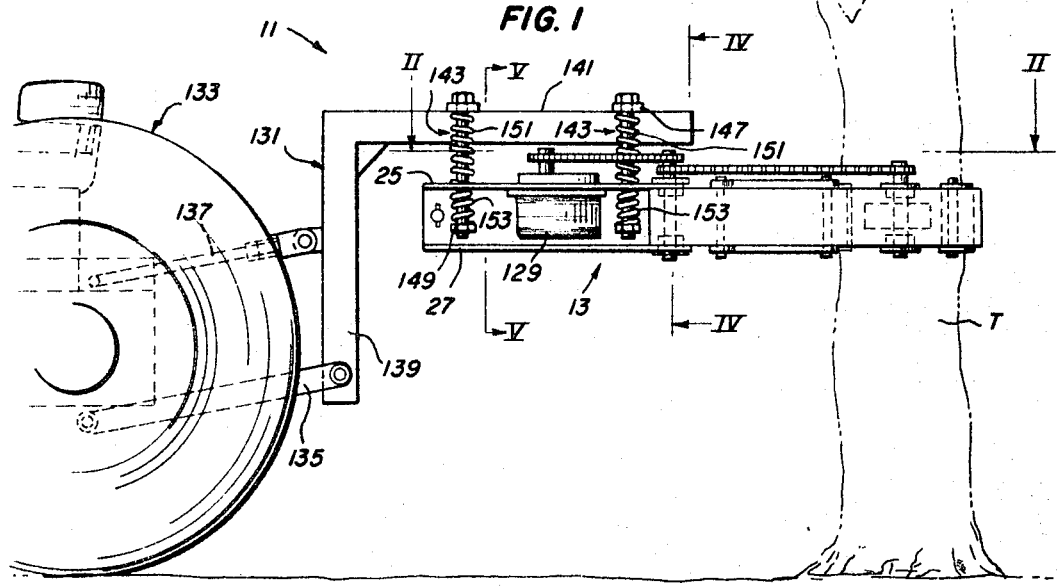
FIG. 1 is a side elevational view of the device of the present invention shown in position to shake a tree and with only a portion of the supporting tractor being shown.

Referring now to the drawings in which the various parts are indicated by numerals and referring first to FIGS. 1–5, the shaker 11 of the present invention comprises in general a clamping mechanism 13 for clamping the tree T to be shaken, vibration mechanism 15 mounted on clamping mechanism 13 adjacent the tree T, and means for supporting the clamping mechanism adjacent the tree to be shaken.

Clamping mechanism 13 includes, in general, a pair of pivotable jaws or arms 17, 19 pivotally supported from a horizontal frame 21, for pivot about vertical axes, and an intermediate arm 23 movably mounted on frame 21 for linear forward and rearward movement of the arm.

Frame 21 preferably includes matching vertically spaced upper and lower plates 25, 27 that are substantially triangular and are rigidly interconnected by the vertical members 29, 31 that are laterally spaced apart and extend fore and aft of the frame to establish the substantially square sectioned socket 33 in frame 21 and in which intermediate arm 23 is slidably mounted.

Intermediate arm 23 is preferably box-like in construction and preferably includes interconnected sides 35, 37 and top and bottom members 39, 41. A piston-cylinder assembly 43 is interconnected between frame 21 and intermediate arm 23. Thus, the cylinder 45 of piston-cylinder assembly 43 is anchored as by means of the horizontal pin 47 to the frame 21 with the pin extending through aligned apertures in lug 49 attached to cylinder 45 and in the vertical members 29, 31. Also, the end of the piston 51 of piston-cylinder assembly 43 is preferably connected to the outer end of intermediate arm 23 as by means of a vertical pin 53 extending through aligned apertures in members 39, 41 and the end of piston 51. In addition, a pad 55 which has a concave tree contacting surface 57, is pivotally mounted on pin 53 and forms a part of intermediate arm 23. A suitable fluid under pressure, such as hydraulic fluid, and suitable lines, valves, etc., well known to those skilled in the art are provided for selectively extending and retracting piston-cylinder assembly 43 which in turn causes intermediate arm 23 to move between the clamping position shown in solid lines in FIG. 2 in which the surface 57 is in contact with tree T and positions outwardly away from the tree as shown in broken lines in FIG. 2. Pivotable jaws or arms 17, 19 are substantially alike and the following description of pivotable arm 17 will suffice for both.

Pivotable arm 17 preferably is of hollow construction and includes spaced apart upper and lower plate members 59, 61 interconnected by the curved and irregular side members 63, 65. The pivotal attachment of arm 17 to frame 21 is adjacent the inner end 67 of the arm and is of any suitable construction known to those skilled in the art, as for example, a pair of bearings 68 that also serve to rotatable support a vertical shaft 69, the function of which will be referred to later in the specification. At the outer end 71 of arm 17 is provided a pad 73, similar to pad 55, and which is provided with a concave tree contacting surface 75. Pad 73 is pivotally attached to the main portion of the arm by suitable means as the vertical pin 77. Link means, which if desired, is preferably in the form of an upper rigid link 79 and a lower rigid link 81 are disposed between arm 17 and intermediate arm 23. If desired, a single link may be employed with one of the links 79, 81 being omitted without departing from the spirit and scope of the present invention.

Links 79, 81 are pivotally attached to intermediate arm 23 adjacent the outer end thereof as by means of a pin 83 and the opposite ends of the links 79, 81 are pivotally attached intermediate the ends of arm 17 as by means of the pin 85. Spacer sleeves 86 are preferably provided around the pins 83, 85.

Arm 19, which as heretofore-mentioned is similar to arm 17, except that it is of righthand construction whereas arm 17 is of lefthand construction, is also provided with a pad 87 having a tree contacting surface 89 that is pivotally attached to arm 19 as by the vertical pin 90.

Bearings 91 corresponding to bearings 68 and which have a shaft 92 rotatably extending therethrough corresponding to shaft 69, pivotally connect arm 19 to frame 21. Link means, which preferably comprise upper and lower links 93, 95 and which respectively correspond to links 79, 81, are pivotally attached adjacent the opposite ends thereof to arms 19 and 23.

One of the edges of each of the pads 73, 87, and both of the edges of pad 55 are preferably turned back as at 96 so that there is no possibility of sharp edges contacting the bark of the tree to be shaken.

Figure 2:
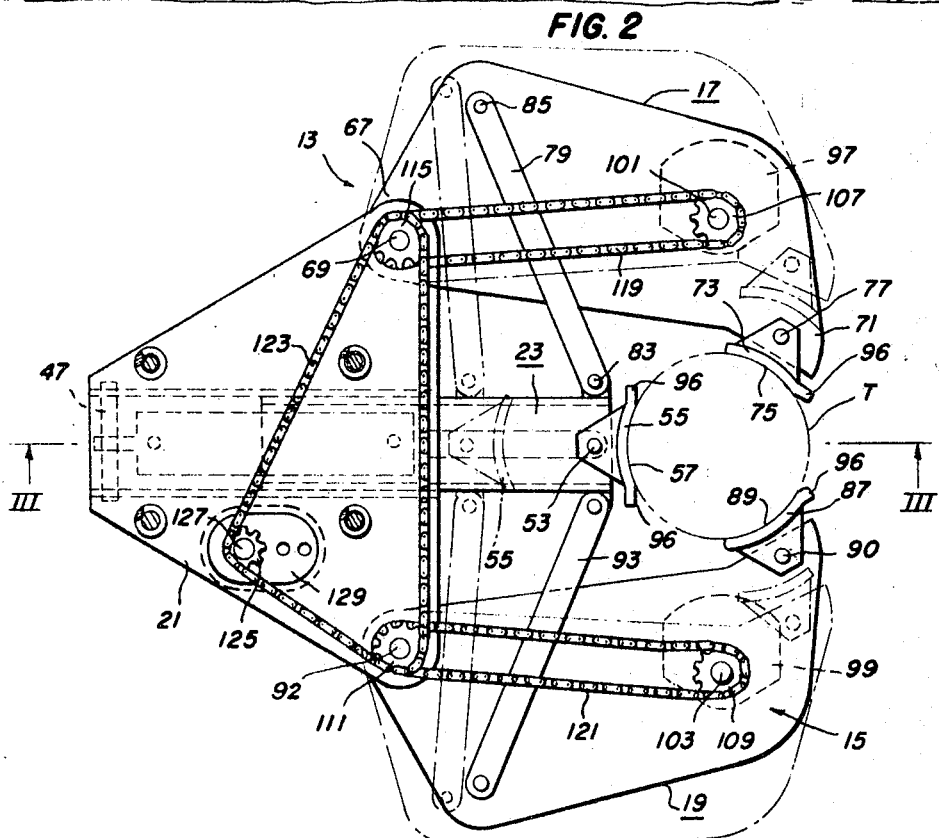
FIG. 2 is a top plan view of the device of the present invention with the clamping positions of the arms being shown in solid lines and with the open position of the arms being shown in broken lines.
Figure 3:
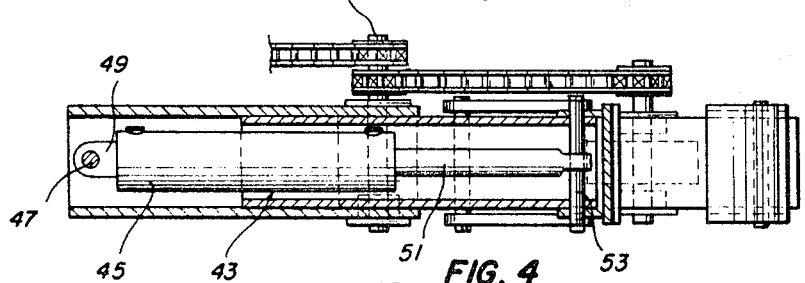
FIG. 3 is a sectional view taken as on the line III—III of FIG. 2.
Figure 4:
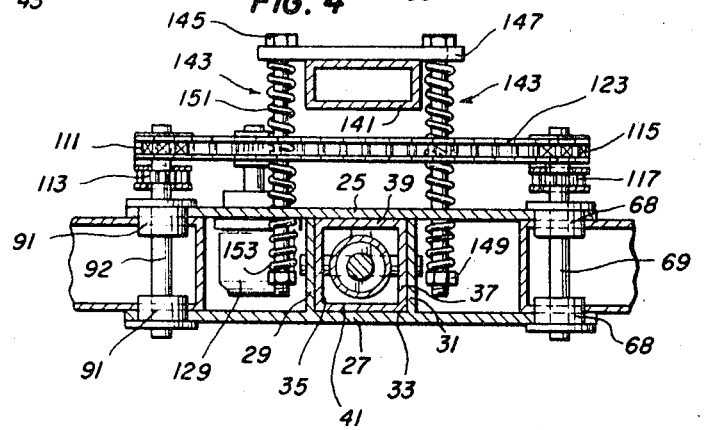
FIG. 4 is a fragmentary sectional view taken as on the line IV—IV of FIG. 1.
Figure 5:
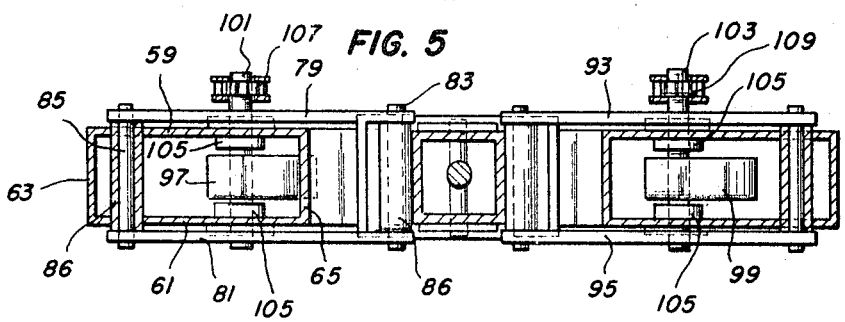
FIG. 5 is a sectional view taken as on the line V—V of FIG. 1.

The relative lengths of arms 17, 19, 23, links 79, 81, 93, 95, their places of attachment, and their arrangement, etc., are such that when intermediate arm 23 is moved from the broken line position to the solid line position shown in FIG. 2, by actuation of piston-cylinder assembly 43, as heretofore-described, intermediate arm 23 will pull the links 79, 81, 93, 95 forwardly and inwardly to cause pivotable arms 17, 19 to move from the broken line positions shown in FIG. 2 to the solid line positions and when the intermediate arm 23 is retracted to the broken line position, it will cause the pivotable arms 17, 19 to move back into the broken line positions. In other words, by the retraction and extension of the single piston-cylinder assembly 43, the arms 17, 19 and 23 are caused to move respectively into and out of the open positions shown in broken lines and closed positions relative to the tree T as shown in solid lines. It will be noted that when the arms 17, 19 and 23 are in said closed positions, that the pads 55, 73, and 87 contact the tree T at points or places substantially 120° apart. Thus, the clamping mechanism 13, when in the clamped position shown in solid lines in FIG. 2, is positively and effectively joined to the tree T so that regardless of the direction of movement of the clamping mechanism 13, the motion is transferred to the tree.

The following is a description of the preferred construction of the vibration means or vibration mechanism 15: A pair of weights 97, 99 are eccentrically mounted respectively on pivotable arms 17, 19 adjacent pads 73, 87, and therefore the weights are closely adjacent the tree T to be shaken. The weights 97, 99 are respectively affixed to and mounted on the vertical shafts 101, 103 which in turn are rotatably mounted from the arms 17, 19 by suitable means as the bearing 105. Sprockets 107, 109 are respectively affixed to shafts 101, 103. An idler double sprocket having an upper sprocket portion 111 fixed to a lower sprocket portion 113, is mounted on shaft 92. Similarly, an idler double sprocket, having an upper sprocket portion 115 fixed to a lower sprocket portion 117, is mounted on shaft 69. An endless chain 119 extends over lower sprocket portion 117 and sprocket 107, and a similar endless chain 121 extends over lower sprocket portion 113 and sprocket 109. Another endless chain 123 extends over upper sprocket portions 111, 115 and a sprocket 125, which is on the drive shaft 127 of a motor 129, that is of any suitable type and preferably is a hydraulic motor driven from a suitable source of hydraulic fluid, not shown. It will be understood that drive of motor 129 causes rotation of the eccentric weights 97, 99. The eccentric weights 97, 99 are preferably in phase and are rotated together, that is, the weights are always on the same sides of the respective shafts 101, 103. For example, it will be noted that the positions of the weights 97, 99 are the same, as viewed in FIG. 2, relative to the shafts upon which they are mounted and the weights will be turned together from these positions as they rotate. This will cause a rotary vibration of the clamping mechanism 13 which in turn will be transmitted efficiently to the tree T. The efficiency of the clamping mechanism 13 will be appreciated when it is considered that the effect of all positions of the weights 97, 99 will be transferred to the tree with the tree pads positioned substantially 120° apart, but which would not be transferred to the tree if, for example, there were only two pads on opposite sides of the tree. In the latter-mentioned case, when the weights were substantially 90° from the positions shown in broken lines in FIG. 2 and the forces were moving tangent to the tree at the two pads, the pads would have a tendency to pull the bark off the tree and not transmit the force thereto. However, with the use of the present invention such a tendency to pull the bark off does not exist and the forces would be transferred directly to the tree.

Means are provided for supporting clamping mechanism 13 adjacent the tree T to be shaken and this means preferably includes a substantially L-shaped support arm 131 which is preferably supported from a self-powered vehicle such as the tractor 133 partially shown in FIG. 1. The support arm 131 is supported from tractor 133 by suitable means, as for example, the well known three point type of hitch shown which includes the draft bars 135 and the spacer bar 137 that are detachably connected to the vertical portion 139 of support arm 131 by suitable means. Frame 21 is resiliently supported from the horizontal portion 114 of support arm 131 as by means of a plurality of the resilient assemblies 143. Each of resilient assemblies 143 preferably includes a bolt 145 extending loosely through a hole in a cross piece 147 fixedly attached to portion 141 and loosely through a hole in upper plate 25 of frame 21. A nut 149 or other securing means is disposed at the lower end of bolt 145 and a pair of springs 151, 153 are disposed around bolt 145 on either side of upper plate 25 to resiliently support the frame and act as a buffer between the frame and support arm 131.

In the operation of the shaker 11 of the present invention, with the clamping mechanism 13 being in the open position heretofore-described, tractor 133 is maneuvered into such position that the tree T to be clamped is disposed in proper relationship relative to the arms 17, 19, 23 and then the clamping mechanism is closed to clamp the tree T as shown in solid lines in FIG. 2. Next, the vibration mechanism 15 is started which causes a circular vibration of the clamping mechanism 13 and thus, a circular vibration of the tree T to shake the nuts or fruit therefrom.

Figure 6:
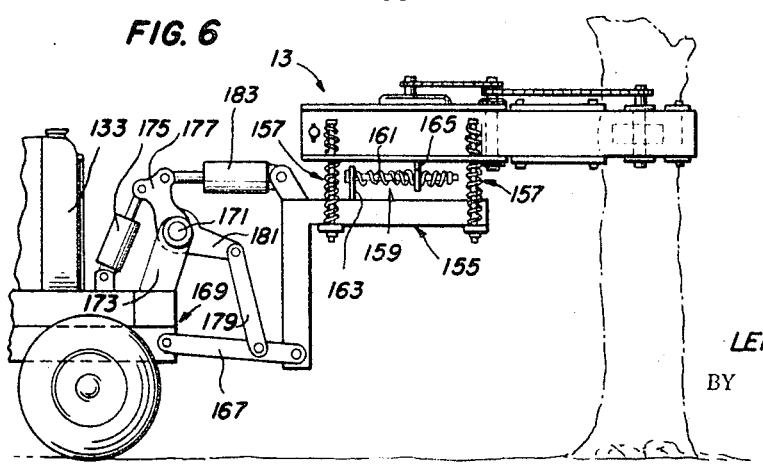
FIG. 6 is a side elevational view on a reduced scale showing a modified arrangement of the present invention.

Referring now to FIG. 6, it will be seen that in this modified arrangement, the clamping mechanism 13 is the same as the embodiment shown in FIGS. 1–5 but the mounting of the clamping mechanism from the tractor 133 is different. In the arrangement shown in FIG. 6, mechanism 13 is mounted on the front of the tractor 133 and is supported on top of the support arm 155, which corresponds to support arm 131 of the embodiment of FIGS. 1–5, rather than below the support arm. The resilient assemblies 157 resiliently supporting mechanism 13 on support arm 155 are similar to resilient assemblies 143 of the principal embodiment. Also, a similar resilient assembly 159 is horizontally disposed, with the bolt 161 thereof extending through apertures in the brackets 163, 165, respectively fixedly attached to support arm 155 and clamping mechanism 13. Although not shown, it will be understood that resilient assembly 159 may be employed, if desired, with the embodiment shown in FIGS. 1–5. By the same token, if desired, the clamping mechanism 13 may be supported above support arm 131 in the embodiment shown in FIGS. 1–5.

In the modified arrangement shown in FIG. 6 support arm 155 is supported by links 167 (corresponding to draft bars 135 of the preferred embodiment) which are preferably pivotally attached to the support arm and to a suitable sub-frame 169 which in turn is supported from the front of tractor 133. A horizontal shaft 171 is turnably mounted in suitable bearings and supported from the main body of the sub-frame 169 as by the members 173 (only one of which is shown). A piston-cylinder assembly 175 is pivotally attached at one end to sub-frame 169 and pivotally attached at the opposite end to arm 177, which is turn is affixed to shaft 171 so that selective extension or retraction of piston-cylinder assembly 175 by suitable valves, source of fluid pressure, etc., not shown, is effective to turn shaft 171 in the desired direction. Turning of shaft 171 is effective to raise or lower the links 167 which in turn raises or lowers the mechanism 13, since links 167 are connected to shaft 171 through links 179 and arms 181. It should be noted that arms 181 are affixed to shaft 171 and links 179 are pivotally attached at opposite ends respectively to links 167 and arms 181. Also, it should be noted that only one of the links 167, 179 and arms 181 are shown in FIG. 6 but that two of each are preferably provided, i.e., one on each side of the tractor. A piston-cylinder assembly 183 is pivotally connected at one end to arm 177 and is pivotally connected at the other end to support arm 155 so that selective extension or retraction of piston-cylinder assembly 183 by suitable valves, source of fluid pressure, etc., not shown, is effective to level the clamping mechanism 13.

From the foregoing description, it will be understood that a highly efficient and effective shaker is provided. Further, it will be understood that a unique arrangement of clamping mechanism 13 is provided which efficiently and positively connects the clamping mechanism to the tree T. Also, it will be understood that the clamping mechanism 13 may be used to clamp other articles which have a cylindrical surface, as for example, paper rolls or logs.

I claim:

1. A shaker for trees comprising a frame, means for supporting said frame adjacent a tree to be shaken, a pair of pivotable arms pivotally mounted on said frame for movement between a clamping position relative to the tree and positions outwardly away from the tree, an intermediate arm movably mounted on said frame for linear movement lengthwise between a clamping position relative to the tree and positions outwardly away from the tree, link means interconnecting said intermediate arm and said pivotable arms for moving said pivotable arms into said clamping position responsive to movement of said intermediate arm into said clamping position, actuating means connected to said intermediate arm for moving said intermediate arm into said clamping position, said intermediate arm and said pivotable arms, when in said clamping position, being arranged for contacting the tree at places substantially 120° apart relative to the tree, and vibration means carried by the pivotable arms for vibrating the arms, the frame, and the tree, said vibration means including two weights, means mounting each weight for rotation on a separate one of said pivotable arms on opposite sides of the tree clamped between said pivotable arms and said intermediate arm, each said weight being mounted for rotation in a generally horizontal plane around a generally vertical axis that is offset from the center of gravity of the weight so that rotation of the weights will create unbalanced horizontal forces on the arms, the frame, and the tree, and means for rotating the weights in phase so that the unbalanced force produced by each weight will be parallel to and exerted in the same direction as the unbalanced force produced by the rotation of the other weight to cause the forces transmitted to the tree through the arms to vary through 360° and cause circular vibration of the arms and the tree.

2. A shaker for trees comprising a vehicle, a support arm supported from said vehicle, a frame, means resiliently supporting said frame from said support arm, a pair of substantially horizontal pivotable arms each having an inner end and an outer end, a pair of tree contacting pads respectively mounted on the outer ends of said pivotable arms, means pivotally mounting said pivotable arms adjacent the inner ends thereof at spaced apart places on said frame for permitting pivoting of said arms between a clamping position relative to the tree to be clamped in which said pads are in contact with the tree and open positions away from the tree, a substantially horizontal intermediate arm disposed between said spaced apart places on said frame, a tree contacting pad mounted on the end of said intermediate arm, said intermediate arm being slidably mounted on said frame for linear endwise movement between an extended clamping position in which said tree contacting pad mounted on the end thereof is in contact with the tree and retracted positions away from the tree, piston cylinder means interposed between said frame and said intermediate arm for moving said intermediate arm between clamping and retracted positions thereof, pair of link means respectively extending between said intermediate arm and said pivotable arms for moving said pivotable arms between said clamping and open positions responsive to movement of said intermediate arm between said clamping and retracted positions, a pair of weights rotatably and eccentrically mounted respectively on said pivotable arms adjacent the outer ends thereof and on opposite sides of the tree to be clamped, said weights being substantially in line with one another and with the center of the tree when clamped, and means for rotating said weights in phase with one another to vibrate said pivotable arms and in turn shake the clamped tree.

References Cited

UNITED STATES PATENTS

| | | | |
|---|---|---|---|
| 1,688,404 | 10/1928 | Stark | 294—115 X |
| 3,077,721 | 2/1963 | Balsbaugh | 56—328 |
| 3,325,029 | 6/1967 | Rigsby | 294—88 X |
| 3,338,040 | 8/1967 | Shipley | 56—328 |

ANTONIO F. GUIDA, Primary Examiner

PASQUALE A. RAZZANO, Assistant Examiner

U.S. Cl. X.R.

294—88, 115